United States Patent
Thompson et al.

(10) Patent No.: US 7,226,387 B2
(45) Date of Patent: Jun. 5, 2007

(54) CONTROL SYSTEM FOR REGULATING A GROUND SPEED OF A VEHICLE

(75) Inventors: Warren L. Thompson, Baltic, SD (US); Rex L. Ruppert, Benson, MN (US)

(73) Assignee: CNH America LLC, Racine, WI (US)

(*) Notice: Subject to any disclaimer, the term of this patent is extended or adjusted under 35 U.S.C. 154(b) by 221 days.

(21) Appl. No.: 11/149,888

(22) Filed: Jun. 10, 2005

(65) Prior Publication Data
US 2006/0223669 A1    Oct. 5, 2006

Related U.S. Application Data

(60) Provisional application No. 60/667,558, filed on Apr. 1, 2005.

(51) Int. Cl.
*B60W 10/04* (2006.01)
(52) U.S. Cl. .......................... 477/107; 701/93
(58) Field of Classification Search ............... 477/107, 477/110; 701/54, 93
See application file for complete search history.

(56) References Cited

U.S. PATENT DOCUMENTS

| | | | |
|---|---|---|---|
| 4,157,124 A * | 6/1979 | Poore | 180/178 |
| 4,582,141 A | 4/1986 | Van der Lely | |
| 4,740,898 A | 4/1988 | McKee et al. | |
| 5,053,963 A | 10/1991 | Mack | |
| 5,406,483 A | 4/1995 | Kallis et al. | |
| 5,882,277 A * | 3/1999 | Iizuka | 477/125 |
| 6,144,910 A | 11/2000 | Scarlett et al. | |
| 6,169,950 B1 | 1/2001 | Parigger | |
| 6,175,797 B1 * | 1/2001 | Iizuka | 701/51 |
| 6,202,780 B1 | 3/2001 | Tanaka et al. | |
| 6,317,678 B1 | 11/2001 | Linden | |
| 6,442,466 B1 * | 8/2002 | Akanuma et al. | 701/51 |
| 6,535,808 B1 | 3/2003 | Zumberge | |
| 6,553,302 B2 | 4/2003 | Goodnight et al. | |
| 6,681,551 B1 | 1/2004 | Sheidler et al. | |
| 6,704,637 B1 | 3/2004 | Hrazdera et al. | |
| 6,719,076 B1 | 4/2004 | Tabata et al. | |
| 2002/0010534 A1 | 1/2002 | Goodnight et al. | |
| 2003/0109975 A1 | 6/2003 | Paice et al. | |
| 2004/0006957 A1 | 1/2004 | Sheidler et al. | |
| 2004/0193350 A1 | 9/2004 | Pirotais | |

FOREIGN PATENT DOCUMENTS

JP    2002243031 A  *  8/2002
JP    2004076934 A  *  3/2004

* cited by examiner

*Primary Examiner*—Ha Ho
(74) *Attorney, Agent, or Firm*—Rebecca Henkel

(57) ABSTRACT

A system is provided for regulating a ground speed of a vehicle having an engine and a variable transmission that is driven by the engine. The system includes a mode selector that is movable for selection between a high speed mode of operation and a deceleration mode of operation. The system also includes a controller connected in communication with the mode selector and a manual input. The controller is configured to receive and store a deceleration gear value via the manual input for operation of the system. When the mode selector is selectively positioned for the deceleration mode of operation, the controller is operatively connected to cause the engine to operate at a deceleration engine speed value, and to cause the transmission to automatically shift to the deceleration gear value.

20 Claims, 3 Drawing Sheets

1

CONTROL SYSTEM FOR REGULATING A GROUND SPEED OF A VEHICLE

CROSS-REFERENCE TO RELATED APPLICATIONS

The present application claims the benefit of U.S. Provisional Applications No. 60/667,558 filed on Apr. 1, 2005 and hereby incorporated herein by reference in its entirety.

FIELD OF THE INVENTION

The invention relates to a system and method of regulating a ground speed of a vehicle, and more specifically, relates to a system and method operable to detect a deceleration of the vehicle and in response to set the vehicle at a predetermined deceleration engine speed and at a predetermined deceleration transmission gear value.

BACKGROUND OF THE INVENTION

Known cruise control systems have been developed to set a ground speed of vehicle. These known cruise control systems are often employed on work vehicles such as floaters, construction vehicles and the like to maintain an optimum speed during lengthy work trips (e.g., plowing, mowing, hauling, etc.). There are certain circumstances where it is necessary to temporarily drive with a lower speed and then resume driving at the optimum speed. These circumstances include, but are not limited to, the following: turning on the headlands when mowing, where narrow turns have to made and where it is often necessary to drive back and forth; driving faster over bare areas when mowing; and driving downhill when hauling heavy loads.

In particular, a certain known cruise control system has been developed in regulating the ground speed of a floater. Upon activation of this certain known cruise control system, the operator can set an engine speed (i.e. rpm) within a range, and then the transmission would shift through the gears to reach the desired ground speed (engine speed combined with gear equals ground speed). This certain known cruise control system also includes a deceleration mode where the floater automatically slows to a predetermined ground speed to avoid undesired sliding or rutting of the field. This deceleration mode is typically employed when turning the floater around a corner. When the deceleration mode is activated, the system automatically slows the engine speed to a predetermined value, and then the transmission automatically calculates the gear or shifts through the gears to reach the desired ground speed. Upon completion of the turn, the operator deactivates the deceleration mode and the engine resumes to the full preset engine speed.

However, this certain known cruise control system as described above has several drawbacks. For example, even though the transmission can shift down gears on demand, the transmission is known to "hang in gear" and not automatically downshift when the power demand of the engine is low (e.g., light load, firm ground, etc.). When the transmission hangs in gear, the engine is known to propel the floater too fast around turns and causes undesired sliding or rutting of the soil. In response, the operator must manually downshift the transmission, which eases lugging of the engine and slows down the ground speed of the floater. The operator can also deactivate the deceleration mode of the cruise control system, but this defeats the purpose of the deceleration mode feature.

Therefore, there is a need or desire for an enhanced vehicular speed control system that addresses the drawbacks described above. The control system should also be configured to be utilized with a wide variety of production vehicles in addition to those related to agriculture.

SUMMARY OF THE INVENTION

The present invention provides a system for and a method of controlling a ground speed of an agricultural vehicle that meets the desires and needs described above.

In a first embodiment of the present invention, a system for regulating a ground speed of a vehicle is provided. The vehicle includes an engine and a transmission that is driven by the engine. The system includes a manual mode selector that is movable for selection between a high speed mode of operation and a deceleration mode of operation. The system also includes an electronic controller connected in communication with the mode selector and a manual input. The controller is configured to receive and store a preset deceleration engine speed value, and to receive and store a preset deceleration gear value received via the manual input, for operation of the system in the deceleration mode. When the mode selector is selectively positioned for the deceleration mode of operation, the controller is operatively connected to cause the engine to operate at the deceleration engine speed value, and to cause the transmission to automatically shift to the deceleration gear value. The controller is also configured to receive and store a high engine speed value to operate the engine at and a high gear value to operate the transmission at in the high speed mode of operation of the system.

In response to a signal from the mode selector, the controller is configured to interrupt or disenable the deceleration mode of operation and to activate or enable the high speed mode of operation of the system. When the mode selector is positioned for high speed mode of operation, the controller is operatively connected to cause the engine to operate at the high engine speed value and to cause the transmission to automatically shift to the high gear value so as to operate the vehicle at a desired ground speed. The preferred controller is configured to cause the transmission to shift to the high speed gear value when an actual engine operating speed increases high enough so as to accomplish the shift of the transmission to the high speed gear value. The preferred system also includes an ON/OFF selector switch operatively connected to control electrical power to the controller. The preferred system also includes a resume selector operatively connected in communication with the controller. The resume selector is connected to selectively communicate a resume signal to the controller. In response to the resume signal when in the deceleration mode of operation, the controller is operatively connected to cause the engine to operate at the deceleration engine speed value and to cause the transmission to shift to the deceleration gear value stored in the memory of the controller. The preferred system further includes a "set" selector operatively connected to the controller. Actuation of the "set" selector is configured to cause the controller to receive and store a second deceleration gear value via the manual input in replacement of the deceleration gear value previously stored by the controller.

In another embodiment, the present invention provides a vehicle that includes an engine having at an engine operating speed, a transmission that is driven by the engine, and a controller. The controller includes a memory in communication with a processor. The memory includes a software program configured to instruct the processor to execute steps for a cruise control system having a deceleration mode and a high speed mode of operation. The steps include the following: receiving and storing a deceleration engine speed value to operate the engine at in the deceleration mode, receiving and storing a deceleration transmission gear value via a manual input to operate the transmission at in the deceleration mode, detecting the actual engine operating speed decreasing to a deceleration speed value, and in response, automatically enabling the deceleration mode of operation, reducing the actual engine operating speed to the predetermined deceleration speed value, and causing the transmission to shift to the deceleration transmission gear value when the engine operating speed is slowed enough so as to accomplish this step.

The present invention also provides a method of controlling a ground speed of a vehicle that includes an engine configured to drive a transmission. The method includes the steps of enabling a cruise control system having a deceleration mode and a high speed mode of operation, the cruise control system including a controller in communication with a memory; receiving a deceleration engine speed value to operate the engine at in the deceleration mode; receiving a deceleration transmission gear value via a manual input to operate the transmission at in the deceleration mode and storing the deceleration transmission gear value in the memory; detecting an actual engine operating speed of the engine decreasing to a predetermined deceleration engine speed; causing the deceleration mode in response to detecting the actual engine at the predetermined deceleration engine speed; recalling the deceleration transmission gear value from the memory; operating the engine at a deceleration engine speed value; and shifting the transmission to the deceleration transmission gear value when the engine operating speed is slowed so as to accomplish this shifting step.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
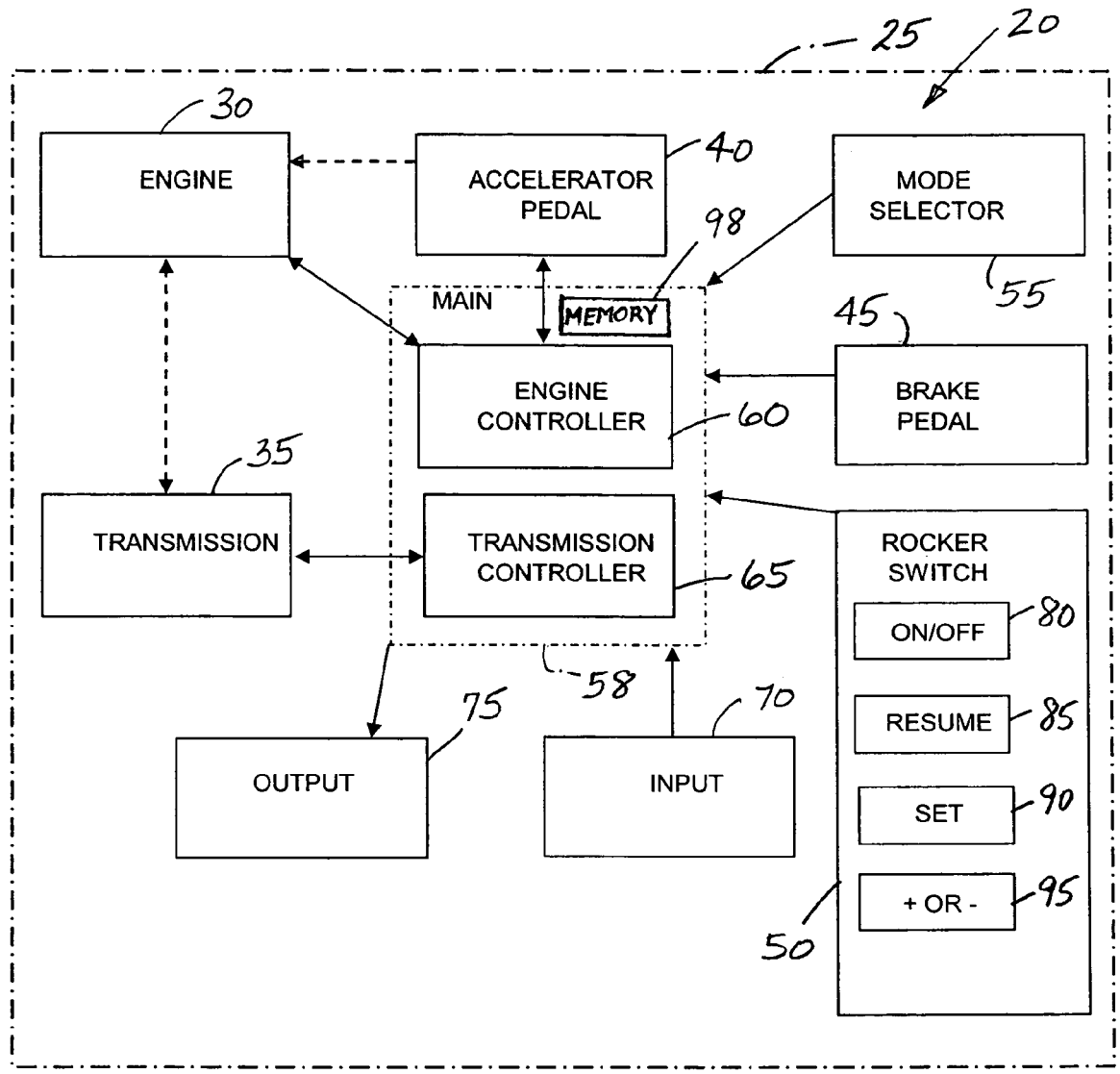
FIG. 1 illustrates a block diagram of a preferred system of controlling the ground speed of the vehicle in accordance with the present invention.

FIG. 1 illustrates a preferred embodiment of a system 20 in accordance with the present invention configured to regulate or control a ground speed of a vehicle (illustrated in dashed line and reference 25). The preferred vehicle 25 is an agricultural vehicle e.g., a conventional floater of a type commonly used to apply crop nutrients or animal or human waste (i.e., sludge) to soils, typically before planting in the spring and/or after harvest in the fall. The vehicle 25 includes a drive train formed by an engine 30 operatively connected with a transmission 35 and a differential gear assembly configured to distribute the drive torque to the series of the wheels (not shown) of the vehicle 25. The preferred type of transmission 35 is automatic, yet other types of transmission (e.g., powershift, continuously variable, etc.) can be used. The system 20 is operatively connected to provide a cruise control function for automatic operation of the engine and the transmission 35.

Still referring to FIG. 1, the preferred system 20 to control or regulate operation of the engine 30 and the transmission 35, and thereby the ground speed, of the vehicle 25 includes an accelerator pedal 40, a temporary interrupt mechanism 45, rocker switch 50, a mode selector device 55, an electronic main controller 58 that includes an engine controller 60 and a transmission controller 65, a manual input 70, and an output device 75.

The accelerator pedal 40 is operatively connected in a conventional manner to control the engine speed (i.e. rpm) of the vehicle engine 30. The accelerator pedal 40 is also operatively connected to the engine controller 60 in a conventional manner such that the operator may set a selected engine speed of the vehicle 30 when the cruise control function of the system 20 is enabled or activated. In addition to controlling a braking force applied to the vehicle 20, the brake pedal 40 is operatively connected in a conventional manner to be a temporary interrupt mechanism operable to temporarily interrupt or disable the cruise function of the system 20.

The rocker switch 50 is generally configured to allow an operator to selectively control activation of the cruise control function of the system 20. The rocker switch 50 is located near the steering wheel (not shown) within reach of the operator and may be actuated by the hand actuating the steering wheel. One embodiment of the rocker switch 50 is mounted on shaft arm as described in U.S. Pat. No. 6,704,637 entitled "SPEED CONTROL FOR A WORK VEHICLE" filed on Apr. 28, 2000 and hereby incorporated herein by reference in its entirety. Another embodiment of the rocker switch 50 is mounted at a console in a cab of the vehicle 25. The rocker switch 50 includes an ON/OFF system switch 80, a resume selector switch 85, a set selector switch 90, and an incremental "+" and "−" selector switch 95.

The ON/OFF switch is operatively connected in a convention manner to enable and disable the system 20. The resume selector switch 85 is operatively connected to selectively enable the cruise control function of the system 20 at a preset parameters stored in a memory 98 of the engine controller 60. The "+" and "−" selector switch 95 preferably includes a pair of momentary push buttons for adjusting the engine speed of the vehicle 25 (i.e., operable when pressed to incrementally increase or decrease the engine speed).

The mode selector device 55 is generally operable, in communication with the engine controller 60, to selectively switch between a high speed mode and a deceleration mode of automatic cruise control operation of the vehicle 25. The preferred mode selector device 55 is described in U.S. Pat. No. 6,704,637 described above. The mode selector device 55 includes a stationary hand lever configured to be embraced by the hand of the operator and operable to slide to a forward position and rearward position for selection between the high speed mode or the deceleration mode of operation.

The engine controller 60 and the transmission controller 65 are part of a main controller 58 having the memory 98 operable to store engine data and/or input so as to be later retrieved. The engine and transmission controllers 60 and 65, respectively, are operatively connected to communicate with one another and in a manner to regulate the actual speed of the vehicle 25. The engine controller 60 includes a programmable microprocessor or the like (e.g., a computer) that executes programmable instructions for regulating the speed of the vehicle 25. In a similar manner, the transmission controller 60 includes a programmable microprocessor or the like that executes programmable instructions for regulating the shifting of the transmission 35. Although the engine controller 60 and the transmission controller 65 are shown combined at a main controller 58, the engine and transmission controllers 60 and 65, respectively, can be discrete components and is not limiting on the invention. The engine controller 60 and/or the transmission controller 65 can include other analog and/or digital logic circuitry, integrated and/or discrete circuit elements and is not limiting on the invention.

In response to the forward position of the hand lever of the mode selector device 55, the engine controller 60 causes the engine 30 to operate at a high engine speed value set by the operator, and the transmission controller 65 automatically calculates the gear value or shift through gear values so as cause the set ground speed of the vehicle. In response to the rearward position of the hand lever of the mode selector device 55, the engine controller 60 causes the engine 30 to operate at a deceleration engine speed set by the operator, and the transmission controller 65 causes the transmission 35 to shift to a deceleration gear value.

The manual input 70 and output device 75 provide an interface for the operator to communicate and interact with the system 20. The manual input 70 provides an interface that allows an operator to provide input or data to the system 20. An example manual input 70 includes a keypad or keyboard of push buttons, a rocker switch have increment and decrement selectors similar in construction to the rocker switch 50, switches, touch devices (e.g., touch screen), pointing devices (e.g., a mouse), a bump shift lever, and other similar devices. The manual input device 70 can even be a computer or other controller connected to the system 20. The manual input 70 is connected to communicate the manually-entered input or data by the operator to the controller 58. The one or more output devices 75 provide an interface that allows the system 20 to provide outputs or data to the operator. Example output devices 75 include display screens (e.g., monitors, liquid crystal displays (LCDs), storage devices (e.g., magnetic or optical storage devices), print devices, or computer or controller connected to the system 20.

Now that the basic architecture of the system 20 has been described, the following is a description of a method 200 of operating the system 20 in regulating the ground speed of the vehicle 25. It is envisioned that the method 200 may be modified for other embodiments of the system 20. For example, if the "+" and "−" selector switches 95 are not present, then the description below for the operation of the "+" or "−" selector switches 95 does not apply. Furthermore, for some embodiments, it is envisioned that not all of the steps below may be required, that some of the steps may be modified, or that the order of the steps may vary.

Figure 2A:
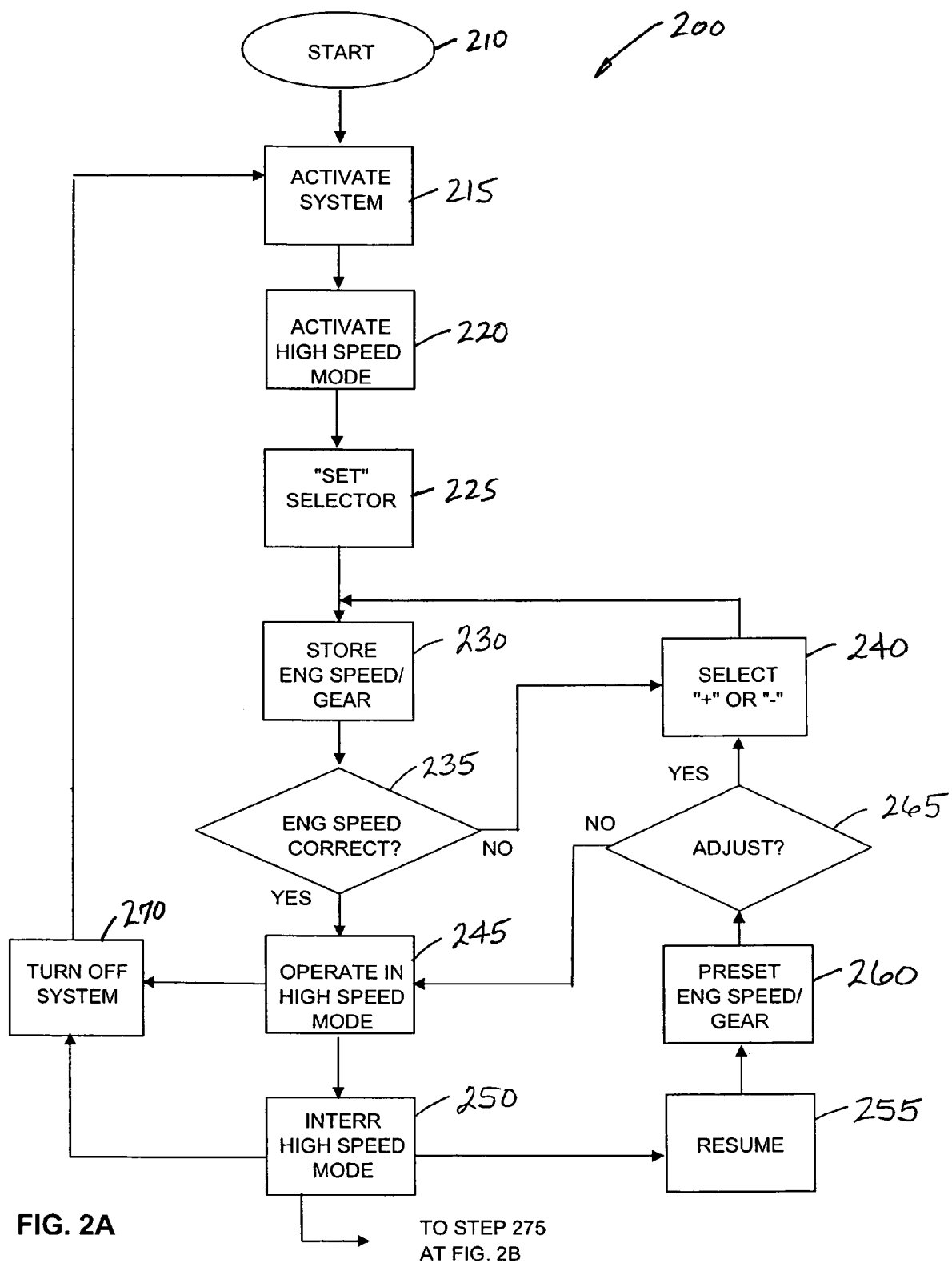
FIG. 2A illustrates one embodiment of a method of controlling a ground speed of a vehicle in accordance with the present invention.
Figure 2B:
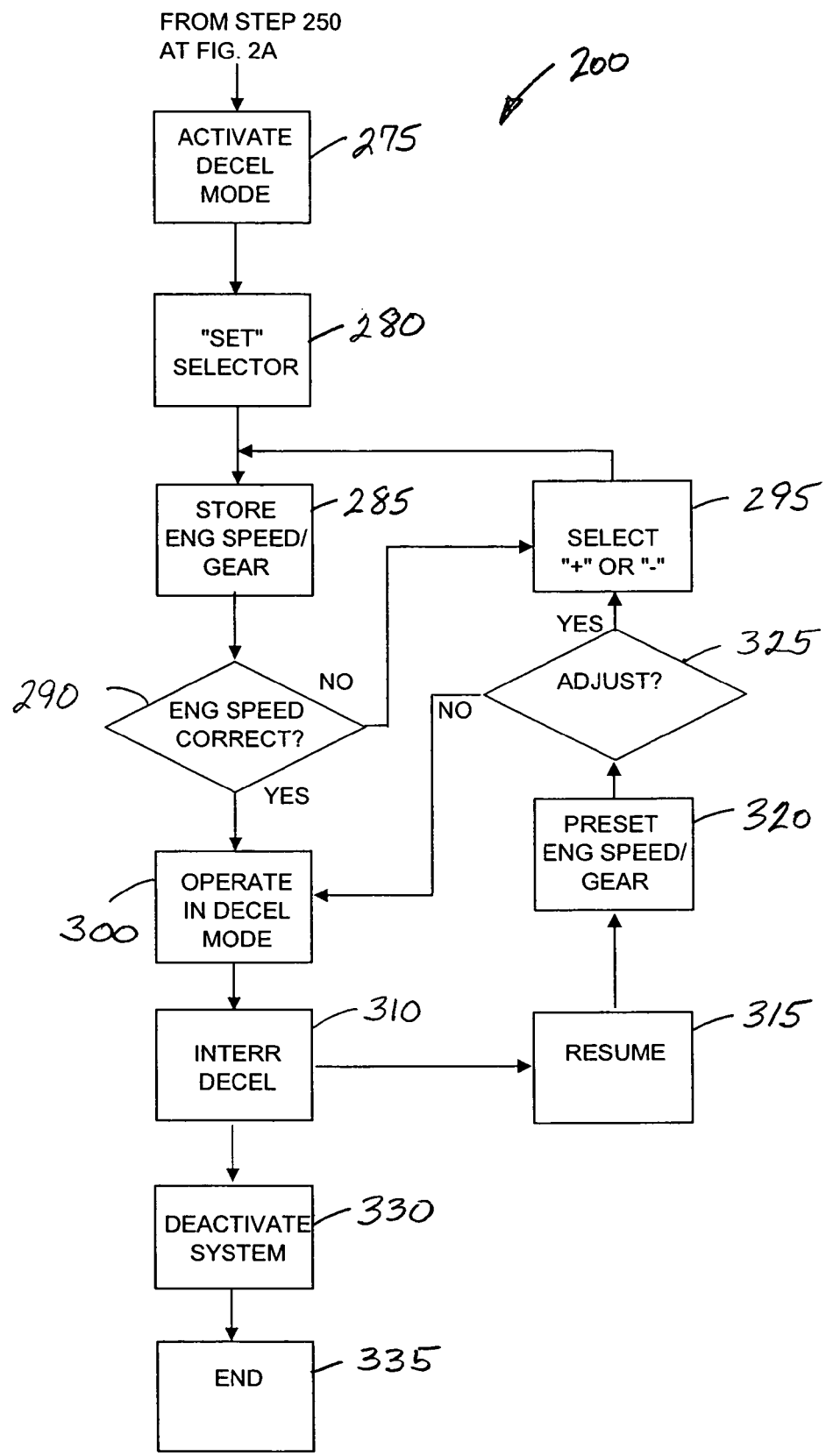
FIG. 2B illustrates a continuation of the method illustrated in FIG. 2A.

FIGS. 2A and 2B illustrate one embodiment of a flow diagram the method 200 of regulating the ground speed of the vehicle 25 in accordance with the present invention. For sake of example, assume that the park brake of the vehicle 25 is released and that the ON/OFF switch 80 and the mode selector device 55 are initially disposed in a deactivate position.

Step 210 is the START of the method 200. At step 215, an operator toggles the ON/OFF switch 80 to an ON position to active the system 20 for regulating the ground speed of the vehicle 20. At step 220, the operator toggles the mode selector device 55 to a position for the high speed mode of operation. At step 225, the operator depresses the accelerator pedal 40 to the desired ground speed of the vehicle and engages the set selector switch 90. Engagement of the set selector switch 90 triggers the engine controller 60 to maintain the engine speed of the engine 30. The transmission controller 65 will automatically shift through gear values or shift to a calculated gear value so as to cause the desired ground speed of the vehicle 25. Once the parameters for the desired high engine speed value and the high gear value is "set" for the high speed mode of operation, the operator can release his foot from the accelerator pedal 40 and the engine controller 60 will automatically cause the engine to operate at the high engine speed value and the transmission controller 65 will automatically cause the transmission 35 to shift through gear values so as to maintain the desired ground speed of the vehicle 25. At step 230, in response to engagement of the "set" selector switch 90, the engine controller 60 receives and stores the actual engine speed value as the high engine speed value. At step 235, the operator determines if the selected high engine speed value is correct. If not, at step 240, the operator toggles the "+" or "−" selector switch 95 on the rocker switch 50 to selectively increase or decrease the high engine speed value. With each toggle of the "+" or "−" selector switch 95, the engine controller 60 updates and stores the high engine speed value in replacement of the high engine speed values previously stored in the controller 58. At step 245, the controller 58 maintains the high speed mode of operation of the vehicle 25 such that the engine controller cause the engine 30 to operate at the high engine speed value, and the transmission controller 65 causes the transmission to shift to a high gear value so as to cause the desired ground speed of the vehicle 25.

At step 250, the operator interrupts operation of the system 20 in the high speed mode of operation by shifting the mode selector 55 to cause the deceleration mode of the operation of the vehicle 25. Alternatively, the step 250 may include the controller 58 automatically interrupting the high speed mode of operation and/or causing the deceleration mode of operation upon detecting an actual engine speed of the engine 30 decreasing to a predetermined deceleration mode engine speed value. Other methods of interrupting the mode of operation (e.g., depressing the brake pedal 45, etc.) can be employed and is not limiting on the invention. Interruption of the system 20 requires the operator to manually adjust the engine speed in accordance to the position of the accelerator pedal 40, as well as requires downshifting the transmission 35 either manually or automatically to the desired gear value for the desired engine speed of the engine 30.

At step 255, the operator actuates or engages the resume selector switch 85 so as to return to automatic high speed mode regulation or control of the vehicle 25 by the system 20. At step 260, the engine controller 60 retrieves, and causes the engine 30 to operate at the previously stored high engine speed value. The transmission controller 65 also retrieves, and causes the transmission 35 to shift to the high gear value. At step 265, the operator can elect to adjust the preset high engine speed value and preset high gear value. If adjustment is not needed, the method 200 follows to step 245. If the operator desires adjustment of the ground speed of the vehicle 25, the method 200 flows to step 240 as described above. At step 270, the operator can toggle the system ON/OFF switch 80 to the OFF position so as to de-energize or deactivate the system 20.

Referring now to FIG. 2B, the deceleration mode of operation of the system 20 will be described. At step 275, the operator toggles the mode selector 55 (e.g., joystick mechanism, foot-operated pedal, etc.) to a position so as to cause the deceleration mode of operation of the vehicle 25. At step 280, the operator releases the accelerator pedal 40 to slow the vehicle 25 to the desired engine speed (i.e., rpm) and actuates or engages the "set" selector 90 on the rocker switch 50. Engagement of the set selector 90 causes the engine controller 60 to maintain the actual engine speed value, and causes the transmission controller 65 to maintain the actual gear value of the transmission 35. Once the parameters for the desired actual engine speed value is "set" for the deceleration mode of operation, the operator can release the accelerator pedal 40, and the main controller 58 will automatically regulate operation of the vehicle 25 at the desired ground speed. At step 285, in response to engagement of the "set" selector 90, the main controller 58 receives and stores the actual engine speed value as a deceleration engine speed value, and receives and stores the actual gear value as a deceleration gear value. At step 290, the operator determines if the selected engine speed is correct. If not correct, at step 295, the operator toggles the "+" or "−" selector switch 95 on the rocker switch 50 to selectively increase or decrease the deceleration engine speed value, or toggle or enter via the manual input 70 an increase or decrease in the deceleration gear value. With each adjustment, the main controller 58 stores the deceleration engine speed value and/or the deceleration gear value in replacement of the previously stored values at step 230.

At step 300, the main controller 58 maintains the high speed mode of operation of the vehicle at the deceleration engine speed value and the deceleration high gear value. At step 310, an operator interrupts or disenables the deceleration mode of operation by moving the mode selector 55 or tapping the brake pedal 45 in a conventional manner. Upon interruption of the deceleration mode of the system 20, the operator assumes manual control of the ground speed of the vehicle 25. At step 315, the operator can actuate the resume selector switch 85 so as to return to automatic control of the vehicle 25 in the deceleration mode of operation. Upon actuating the resume selector switch 85, at act 320 the main controller retrieves or recalls the stored deceleration engine speed and the deceleration gear values. The engine controller 60 automatically causes the actual engine speed to return to the stored deceleration engine speed value, and the transmission controller 65 causes the transmission 35 to shift to the stored deceleration gear value. At step 325, the operator determines whether to adjust the deceleration engine speed value and/or the deceleration gear value. If no adjustment is desired, the method 200 follows to step 300 as described above. If adjustments are needed, the operator can toggle the "+" or "−" selector switch 95 at step 295 as described above to adjust the deceleration engine speed value to operate the engine 30 at, and/or adjust or enter an increase or decrease in the deceleration gear value via the manual input 70. At step 285, the main controller 58 receives and stores the the deceleration engine speed value and the deceleration gear value in replacement of the previously stored value. At step 330, the operator can toggle the ON/OFF switch 80 to an OFF position so as to turn off or deactivate the system 20. Step 335 is the END of the method 200.

Based on the above-described system 20 and method 200 in accordance with the present invention, the operator can enter or adjust the deceleration gear value via the manual input 70 to the main controller 58. Once the deceleration gear value is entered via the manual input 70 by the operator to the controller 58, the transmission controller 65 causes the transmission 35 to operate at the deceleration gear value as entered by the operator. Thereby, the system 20 of the present invention reduces the opportunity for an undesired "hang in gear" event, as described above, known to occur for certain conventional cruise control systems. In contrast to the system 20 of the present invention, conventional systems include a transmission controller configured to calculate or automatically downshift in gear value based on the desired engine speed. Even though the transmission can shift down gears on demand, the transmission of conventional systems is known to "hang in gear" and not automatically downshift when the power demand of the engine is low. With these conventional cruise control systems, the low power demand of the engine is known to occur when carrying a light load or traveling over firm ground. When the transmission "hangs in gear", the engine may propel the agricultural vehicle (e.g., floater, etc.) too fast around turns for soil conditions, typically causing undesired sliding or rutting of the soil.

A wide variety of vehicles 25 could employ the system 20 and method 200 in accordance with the invention. One skilled in the art will recognize that the present invention is not limited to agricultural vehicles. The type of vehicle (e.g., cars, trucks, tractors, floaters, etc.) can vary and is not limiting on the invention.

Many changes and modifications could be made to the invention without departing from the spirit thereof. The scope of these changes will become apparent from the appended claims.

We claim:

1. A system for regulating a ground speed of a vehicle having an engine and a transmission driven by the engine, the engine characterized by an engine operating speed, the transmission having a variable gear value, the system comprising:

a manual mode selector is movable for selection between a high speed mode of operation and a deceleration mode of operation;

a manual input; and a controller connected in communication with the manual mode selector and the manual input, the controller operable to receive and store a preset deceleration engine speed value and a preset deceleration gear value via the manual input for operation of the system in the deceleration mode, wherein when the manual mode selector is selectively positioned for the deceleration mode of operation, the controller reduces an actual engine operating speed of the engine to the preset deceleration engine speed value and causes the transmission to automatically shift to the preset deceleration gear value.

2. The system as recited in claim 1, wherein the controller is configured to receive and store a preset high engine speed value, and wherein when in the high speed mode of operation, the controller increases the actual engine operating speed to the preset high engine speed value.

3. The system as recited in claim 2, wherein the system includes an ON/OFF selector switch for controlling electrical power provided to the controller.

4. The system as recited in claim 2, wherein the controller is configured to cause the transmission to shift to a preset high speed gear value when the actual engine operating speed exceeds a threshold so as to accomplish the shift of the transmission to the high speed gear value.

5. The system as recited in claim 1, wherein the manual input is a keypad.

6. The system as recited in claim 1, wherein the manual input is a rocker switch having a pair of selector buttons, one selector button configured to selectively increment the preset deceleration gear value and the other selector button configured to selectively decrement the preset deceleration gear value.

7. The system as recited in claim 1, further comprising a manual resume selector operatively connected in communication with the controller, wherein the manual resume selector is operable to selectively communicate a resume signal to the controller, and wherein in response to receiving the resume signal when in the deceleration mode of operation, the controller is operatively connected to cause the engine to operate at the preset deceleration engine speed value and to cause the transmission to shift to the preset deceleration gear value received via the manual input.

8. The system as recited in claim 1, wherein the system includes a set selector operatively connected to the controller, wherein upon actuation of the set selector, the controller receives and stores a second deceleration gear value via the manual input to replace the deceleration gear value previously stored by the controller.

9. A vehicle, comprising:
a engine characterized by an engine operating speed;
a transmission driven by the engine, the transmission having a variable gear value; and
a controller including a programmable memory in communication with a processor, the memory including a software program configured to instruct the processor to execute an algorithm of a cruise control function having a deceleration mode, the algorithm including the steps of:
receiving and storing a deceleration speed value to operate the engine at when in the deceleration mode,
receiving a deceleration transmission gear value via a manual input to operate the transmission when in the deceleration mode,
detecting a deceleration of the engine operating speed, and in response thereto, automatically enabling the deceleration mode of the cruise control function,
reducing the engine operating speed to the predetermined deceleration speed value, and
shifting the transmission to the deceleration transmission gear value when the engine operating speed decreases below a threshold so as to accomplish this step.

10. The vehicle as recited in claim 9, further comprising:
a selector switch configured to selectively enable and disenable the cruise control function.

11. The vehicle as recited in claim 10, wherein the cruise control function further includes a high speed mode, and wherein the algorithm further includes the steps of:
storing the deceleration transmission gear value in a memory of the controller, and
retrieving the deceleration transmission gear value that was last received and stored in the memory of the controller.

12. The vehicle as recited in claim 9, further comprising a manual mode selector in communication with the controller, the manual mode selector configured to selectively switch between the deceleration mode and a high speed mode of operation of the vehicle.

13. The vehicle as recited in claim 9, wherein the algorithm further performs the steps of:
detecting a predetermined increase in an actual engine operating speed of the engine, and
disenabling the deceleration mode and enabling a high speed mode of the cruise control function.

14. The vehicle as recited in claim 13, further comprising the steps of:
regulating an engine speed actuator to operate the engine at a high engine speed value when in a high speed mode of the cruise control function, and
shifting the transmission to a high speed transmission gear value when the engine operating speed exceeds a threshold so as to accomplish this shifting step.

15. The vehicle as recited in claim 9, wherein the controller causes the deceleration mode of operation of the vehicle when the controller detects a predetermined engine operating speed decrease threshold value associated with a change in a direction of travel of the vehicle.

16. The vehicle as recited in claim 9, wherein the manual input includes a keypad.

17. The vehicle as recited in claim 9, further comprising a resume selector switch in communication with the controller, the resume selector switch configured when engaged to signal the controller to cause the deceleration mode of operation of the vehicle.

18. The vehicle as recited in claim 9, wherein the algorithm further includes the steps of:
retrieving the deceleration transmission gear value that was last received and stored in the memory of the controller.

19. A method of operating a vehicle that includes an engine configured to drive a transmission, the steps comprising:
enabling a cruise control system having a deceleration mode and a high speed mode, the cruise control system including a controller having a memory;
receiving a deceleration engine speed value to operate the engine at in the deceleration mode and storing the deceleration engine speed value in the memory;
receiving a deceleration transmission gear value via a manual input so as to operate the transmission at wherein in the deceleration mode of operation and storing the deceleration transmission gear value in the memory;
detecting a predetermined deceleration value of an engine operating speed of the engine;
causing the deceleration mode of operation in response to detecting the predetermined deceleration value of a actual engine operating speed;
recalling the stored deceleration engine speed value and the deceleration transmission gear value from the memory;
operating the engine at the deceleration engine speed value; and
shifting the transmission to the deceleration transmission gear value when the actual engine operating speed decreases below a threshold so as to accomplish this shifting step.

20. The method as recited in claim 19, the method further comprising the steps of:
detecting a predetermined threshold increase in the actual engine operating speed; and
disabling the deceleration mode and causing the high speed mode of operation of the vehicle.

* * * * *